United States Patent [19]

Wasserbach

[11] 4,445,835
[45] May 1, 1984

[54] METHOD AND APPARATUS FOR MARBLEIZING AN EXTRUDED DOUGH

[75] Inventor: Max L. Wasserbach, Summit, N.J.

[73] Assignee: Nabisco Brands, Inc., Parsippany, N.J.

[21] Appl. No.: 411,408

[22] Filed: Aug. 25, 1982

[51] Int. Cl.³ .............................................. B29B 5/04
[52] U.S. Cl. .................................. 425/131.1; 264/75; 264/245; 425/201; 425/204; 425/206; 425/239; 425/308; 425/319; 425/376 B; 425/382 R; 426/502; 426/516
[58] Field of Search ........................... 264/75, 245, 73; 425/131.1, 319, 133.1, 376 B, 382 R, 200, 239, 308, 201, 204–206; 426/502, 516, 249; 366/155, 195; 99/450.1

[56] References Cited

U.S. PATENT DOCUMENTS

| | | | |
|---|---|---|---|
| 466,854 | 1/1892 | Mitchell | 425/131.1 |
| 660,717 | 10/1900 | Barber et al. | 425/131.1 |
| 1,083,275 | 1/1914 | Eberhard | 264/75 |
| 2,429,042 | 10/1947 | Bader | 425/319 |
| 2,539,944 | 1/1951 | Bury | 425/131.1 |
| 2,539,945 | 1/1951 | Bury | 425/131.1 |
| 3,014,437 | 12/1961 | Dutchess | 425/131.1 |
| 3,280,764 | 10/1966 | Potter et al. | 366/195 |
| 3,547,050 | 12/1970 | Verhoeven | 425/382 R |
| 3,689,280 | 9/1972 | Werner | 99/450.1 |
| 4,190,410 | 2/1980 | Rhodes | 425/239 |

Primary Examiner—Jeffery R. Thurlow
Attorney, Agent, or Firm—Gerald Durstewitz; Richard Kornutik

[57] ABSTRACT

Marbleized cookie dough pieces are formed by independently feeding different color doughs into a common extrusion die, in which a rotating impeller is located. The impeller lards portions of each dough into the flow of the other to produce a spiral pattern in the extrudate which is sliced to produce spirally marbleized dough pieces.

8 Claims, 5 Drawing Figures

FIG. I

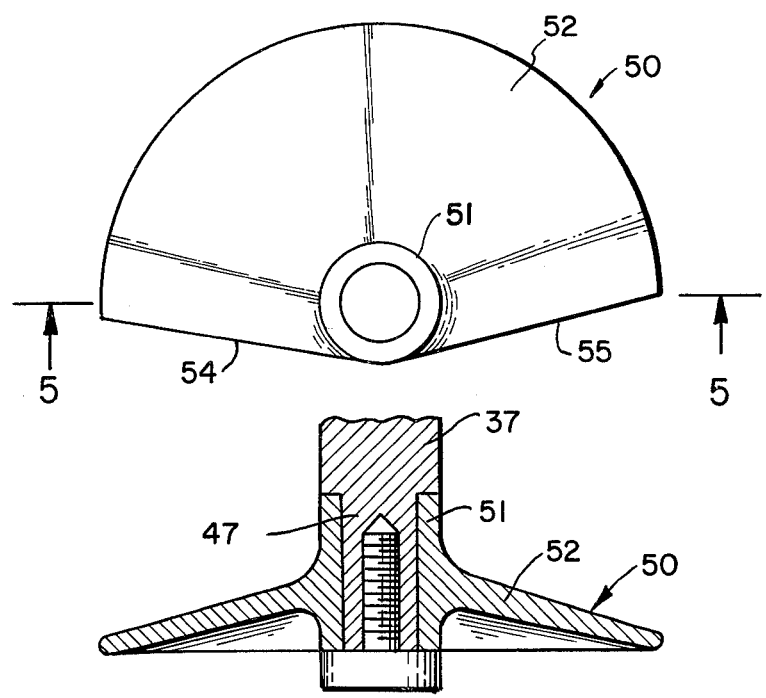

METHOD AND APPARATUS FOR MARBLEIZING AN EXTRUDED DOUGH

BACKGROUND OF THE INVENTION

The present invention relates to dough extrusion, and, more particularly, to the marbleizing of extruded doughs.

The intermixing of light and dark doughs to produce an interesting marble-like effect in baked goods is a well known technique. The two doughs normally are of different flavors, most conventionally vanilla and chocolate, to provide an interesting taste sensation in addition to its attractive appearance.

To produce the marble effect, the two doughs normally must be folded together with great care so that, for example, a segment of dark dough intrudes into a segment of light dough without the loss of the individual characters of the two doughs. Any excessive mixing tends to blend the two doughs and destroys the marbled effect.

SUMMARY OF THE PRESENT INVENTION

It is an object of the present invention to provide a method for automating the production of a marbleized extruded baked goods dough.

Another object is to provide simple and effective apparatus for carrying out the above mentioned method.

BRIEF DESCRIPTION OF THE DRAWINGS

A preferred embodiment of the apparatus of the present invention has been chosen for the purposes of illustration and description, and is shown in the accompanying drawings, forming a part of the specification, wherein:

FIG. 4 is a top view of one of the impellers used by the apparatus; and

FIG. 5 is a sectional view taken along line 5—5 on FIG. 4.

DESCRIPTION OF THE PREFERRED EMBODIMENT

Figure 1:
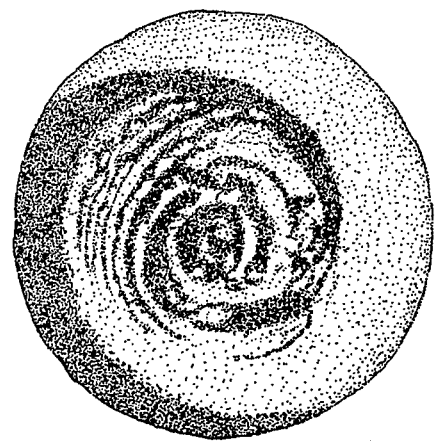
FIG. 1 is a top view of a cookie baked from a dough piece formed by the method and apparatus of the present invention.
Figure 2:
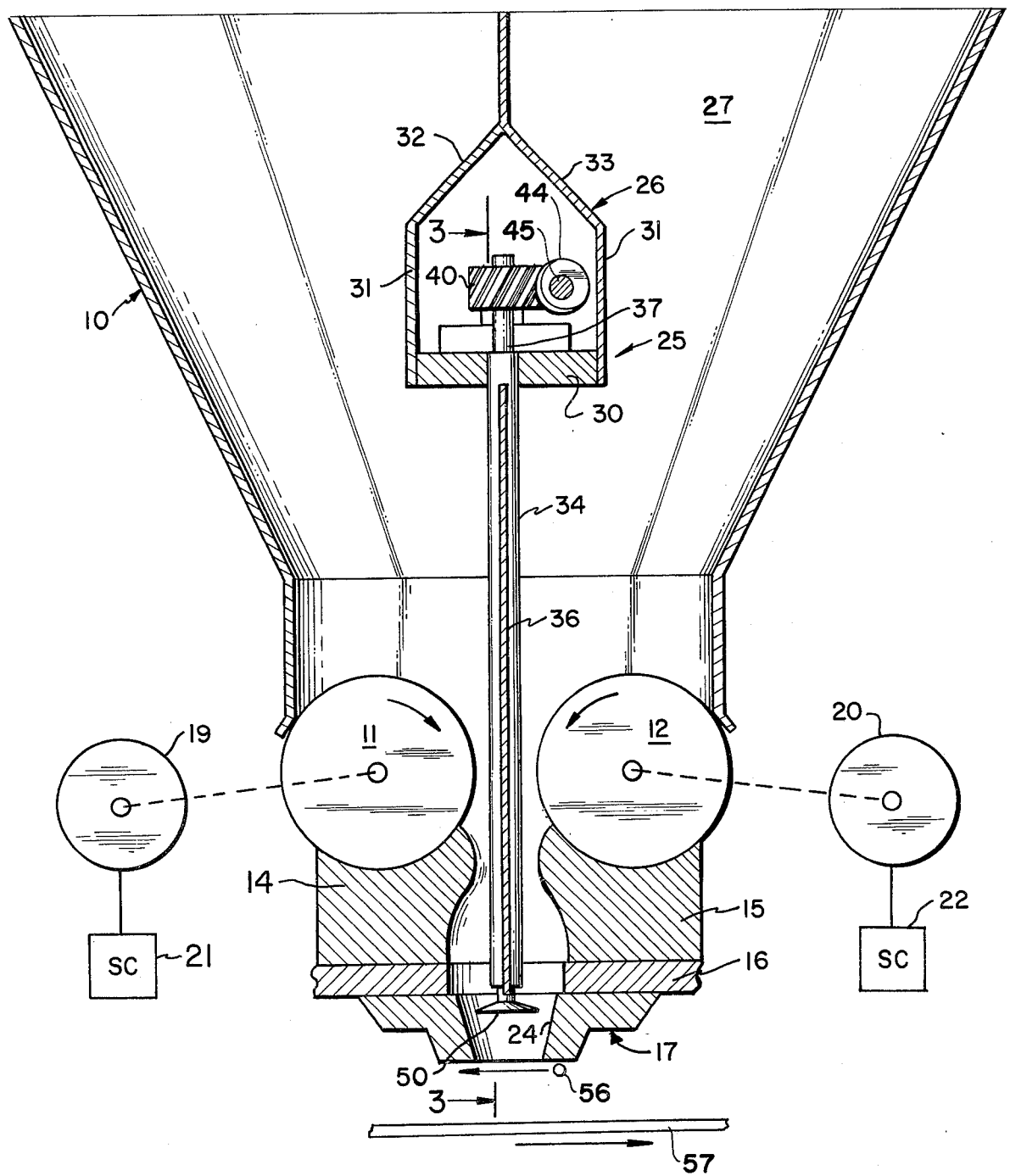
FIG. 2 is a schematic sectional view of apparatus according to the present invention.

Referring to the drawings in detail there is shown in FIGS. 2-5, apparatus according to the present invention which generally comprises a hopper 10, a pair of dough feed rolls 11 and 12, flow directing formations 14 and 15, a base plate 16, and die member 17. The feed rolls 11, 12 are independently driven by motors 19, 20 respectively. The motors 19, 20 are individually controlled by speed control devices 21, 22.

Figure 3:
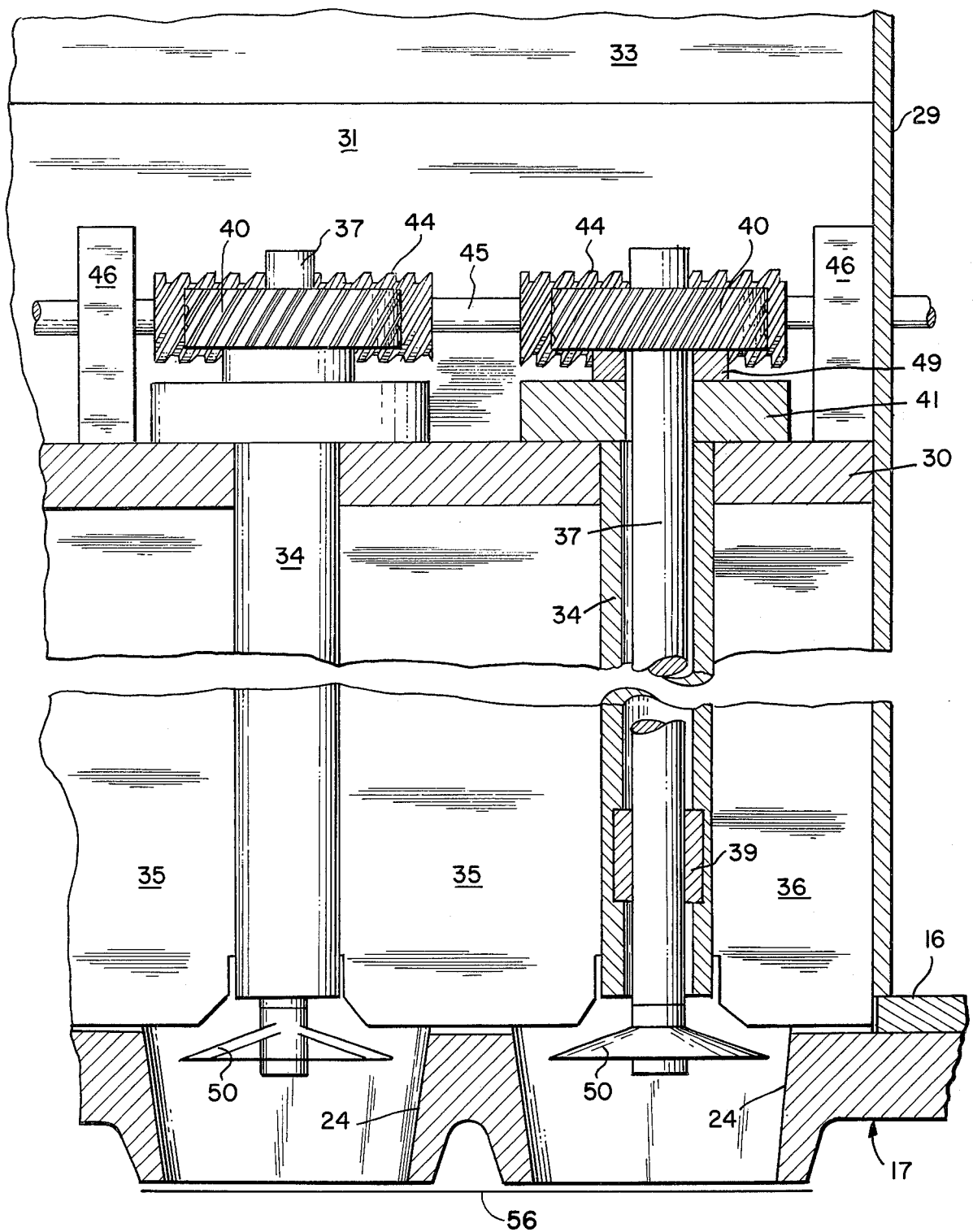
FIG. 3 is a sectional view taken along line 3—3 on FIG. 2.

As seen in FIG. 3, the die member 17 is formed to provide a row of tapered extrusion die passageways 24.

A partition assembly 25 extends downwardly from the mouth of the hopper 10, passing between the rollers 11, 12 and terminating at the die inlets.

The assembly 25 includes a tunnel member 26 extending between the side walls 27, 29 of the hopper 10. The tunnel member 26 comprises a floor member 30, side walls 31, and roof panels 32, 33. A series of tubes 34 are set into the floor member 30 and extend downwardly to the dies. To complete the lower portion of the partition 25, plates 35 are mounted between the tubes, and plates 36 are mounted between the hopper side walls 27, 29 and the end tubes 34.

A shaft 37 extends downwardly through each of the tubes 34 from the tunnel member 26 into the die passageways 24. The shafts 37 are journalled in the tubes 34 by means of bearings 39 (FIG. 3). A worm gear 40 is mounted on the upper end of each shaft 37. A thrust bearing arrangement, shown for convenience as a collar 41 and a washer 42, is positioned on the floor member to engage the gear 40 and support the shaft 37. The worm gears 40 are driven by worm segments 44 keyed to a driven shaft 45 which is supported at intervals by bearing blocks 46.

The lower ends of each of the shafts 37 has a reduced diameter section 47 on which an impeller blade 50 is positioned. The impeller 50 comprises a tubular body 51 which receives a conical blade 52. The blade extends throughout an angle of 180 degrees surrounding the body 51, and has leading and trailing edges 54 and 55 which extend to a point on the body 51 which is opposite to the center of the blade 52.

In operation, a dark dough is poured into the hopper on one side of the partition 25 and a light dough is poured on the other side. The dough feeding rollers 11 and 12 move the doughs along opposite sides of the partition into the inlet of the die passageways 24 when the flows combine. The speed of each roller driver motor 19, 20 is regulated by the speed controls 21, 22 to control the rate of flow of each of the doughs and thereby control the ratio of the different doughs in the product and compensate for differences in the physical properties of the different doughs.

The impellers are driven at a suitable speed, for example 375 rpm, to lard portions of each dough into the flow of the other dough and produce a spiral marbleized pattern within the extrudate.

The extrudate is then sliced by a moving wire 56 to form cookie dough pieces. The dough pieces are deposited on a conveyor belt 57 for transport to a baking oven.

It will be seen from the foregoing that the present invention provides a method for automating the production of marbleized extruded baked goods dough and provides simple and effective apparatus for carrying out this method.

I claim:

1. Apparatus for producing spirally marbleized cookie dough pieces comprising a hopper having an outlet, a plurality of extrusion dies fed from said outlet, a pair of dough feeding rollers spaced from each other and interposed between said dies and said outlet to receive dough flow from said outlet and deliver the dough flow to said dies, a partition dividing said hopper and extending between said rollers to a point adjacent the inlets of said dies, said partition being spaced from each of said rollers whereby different doughs on opposite sides of said partition are independently fed by said rollers along said partition into said dies, an impeller within each die below said partition for larding portions of each dough into the flow of the other dough to produce a spirally marbleized extrudate, said partition including a hollow tube extending to the inlet of each die and plate members interconnecting said tubes, a shaft extending through each of said tubes, said impellers being mounted on said shafts, drive means at the upper ends of said shafts for rotating said shafts to drive said impellers, and means for slicing cookie dough pieces from said spirally marbleized extrudates.

2. Apparatus according to claim 1 wherein said impeller includes a blade having the shape of a segment of an annular cone, the axis of the cone being aligned with the axis of the impeller shaft.

3. Apparatus according to claim 2 wherein said impellers are driven at several hundred revolutions per minute.

4. Apparatus according to claim 3 wherein said impellers are driven at about 375 revolutions per minute.

5. Apparatus for marbleizing an extruded dough comprising a hopper having an outlet, a plurality of extrusion dies fed from said outlet, a pair of dough feeding rollers spaced from each other and interposed between said dies and said outlet to receive dough flow from said outlet and deliver dough flow to said dies, a partition dividing said hopper and extending between said rollers to a point adjacent the inlets of said dies, said partition being spaced from each of said rollers whereby different doughs on opposite sides of said partition are independently fed by said rollers along said partition into said dies, an impeller within each die below said partition for larding portions of each dough into the flow of the other dough to produce a marbleized extrudate, said partition including a hollow tube extending to the inlet of each die and plate members interconnecting said tubes, a shaft extending through each of said tubes, said impellers being mounted on said shafts, and drive means at the upper ends of said shafts for rotating said shafts to drive said impellers, said partition including an enclosed tunnel within said hopper extending along the partition, each of said shafts extending into said tunnel, said drive means being provided within said tunnel.

6. Apparatus according to claim 5 wherein said impeller includes a blade having the shape of a segment of an annular cone, the axis of the cone being aligned with the axis of the impeller shaft.

7. Apparatus according to claim 6 wherein said impellers are driven at several hundred revolutions per minute.

8. Apparatus according to claim 7 wherein said impellers are driven at about 375 revolutions per minute.

* * * * *